March 5, 1935.  R. B. OTWELL  1,993,620
DIVISIBLE FLAT FOR GREENHOUSES
Filed March 23, 1934  2 Sheets-Sheet 1
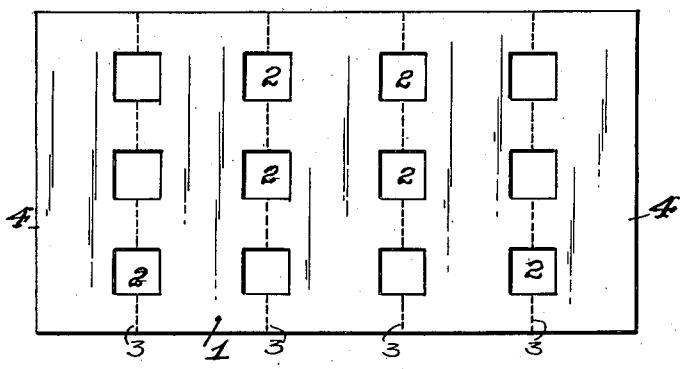
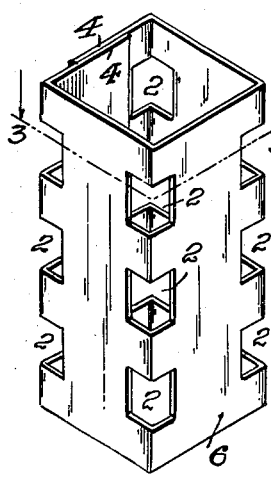
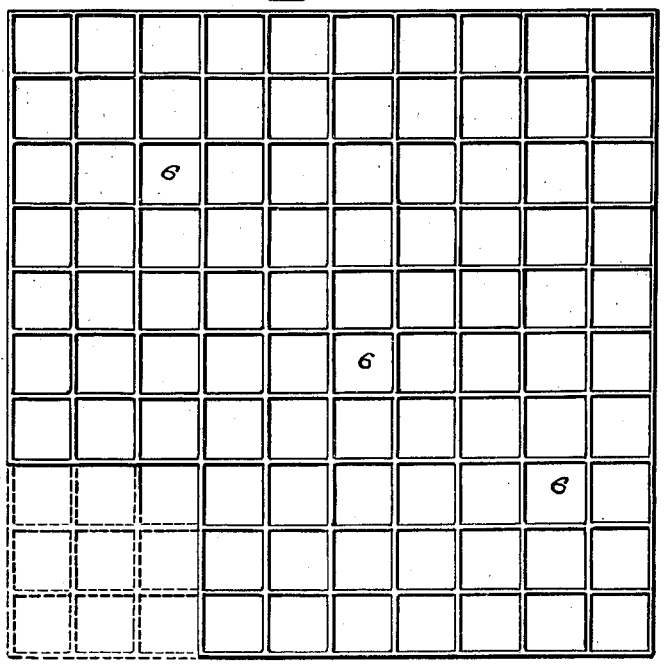
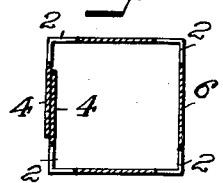
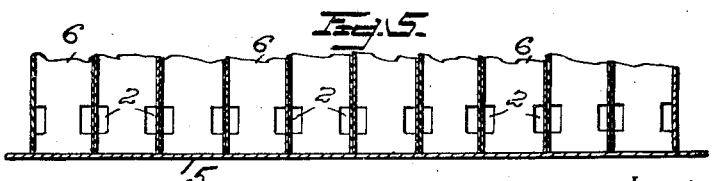
Inventor
Ralph B. Otwell
By S. E. Thomas
Attorney March 5, 1935.　　　R. B. OTWELL　　　1,993,620
DIVISIBLE FLAT FOR GREENHOUSES
Filed March 23, 1934　　2 Sheets-Sheet 2
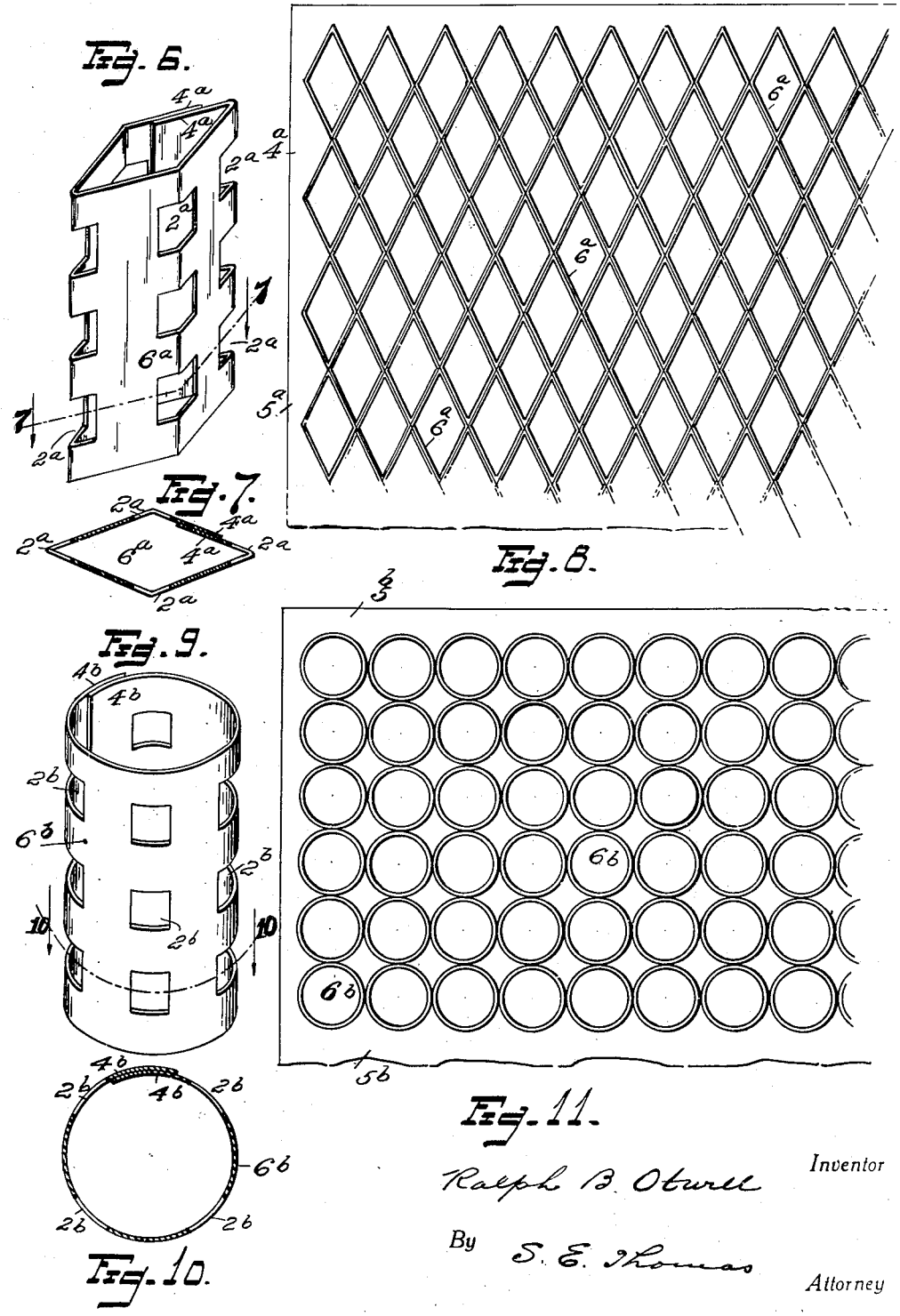
Ralph B. Otwell, Inventor
By S. E. Thomas, Attorney Patented Mar. 5, 1935

1,993,620

UNITED STATES PATENT OFFICE 1,993,620

DIVISIBLE FLAT FOR GREENHOUSES

Ralph B. Otwell, Detroit, Mich.

Application March 23, 1934, Serial No. 716,985

6 Claims. (Cl. 47—37)

This invention relates to an improvement in "flats" or trays employed in greenhouses for germinating seed, in which the plants are grown under glass, to be transplanted later to the soil of an outer garden, and is a further development of the invention shown in Patent No. 1,959,139, dated May 15, 1934.

It is generally known that young plants raised from seed germinated in greenhouse "flats" when transplanted to the open soil of a garden bed are apt to receive a shock which in many instances has been fatal to the plants due to injury of the roots upon being accidentally or unwittingly separated from the soil in which they were raised when removed from the tray, or to the length of time that may have elapsed between the removal of the plant from the soil in the tray to that of the garden,—or other causes which will readily occur to those engaged in this work.

It is customary in the early spring for storekeepers, handling a miscellaneous line of merchandise, to have on sale seeds, bulb and young growing plants, such as: tomatoes, cabbages, etc., also flowering plants of many kinds which are offered for sale bedded in "flats" received from the greenhouses.

When sold, the storekeeper endeavors to separate the plants purchased with a little soil covering the roots that they may more readily take root when transplanted. It is however difficult to do this without disturbing or injuring the plant, or causing the soil to loosen and drop from its roots, which often results in the plant wilting or dying before taking root in its new location.

The primary object of the present invention therefore, is to provide a "divisible flat", formed of individual cells or containers, which may be constructed of paper or other flexible material, open at each end with lateral openings through the walls of each unit, the entire group being temporarily bonded together as an integral element of any desired capacity, which may for example be the size of that of the usual "flat" employed in greenhouses for germinating seed.

While the individual cells or containers may be of any desired shape in cross-section, for example: round,—lozenge-shaped,—square, or other form, it has been found in practice that cells or containers having walls at right angles to each other admit of greater economy in floor space than round, or even lozenge-shaped containers,—in which there would be more or less lost space. And by constructing these cells of paper or other like flexible material, a greater number of plants to a given area may be provided for and at less cost for the production of the "flat",—and furthermore, the floor space required would be much less than is necessary for the same number of plants germinated and sold in the wooden "flats" or trays now employed in greenhouses.

Among other objects of this invention which cannot be too greatly stressed, one consists in that the "flat" being of a temporarily unitary character, and while having all the advantages of the present tray or "flat", has an added advantage in being readily divisible into as many units as there are plants in the flat,—thus the plants may be easily separated from each other without disturbing the soil or the root system of the plants removed, or those remaining in the flat. Furthermore, far less floor space is required under the glass of the greenhouse, than is necessary to provide for wooden "flats". This is in itself a most important item of the overhead cost in greenhouse operation,—the cost, however, of the divisible flat is far less than the usual wooden "flat" or tray.

The plant containers or cells which are preferably constructed of paper, may be made of any suitable fabric, and are manufactured at great speed by means of a blanking die from sheets of paper, which may be first impregnated with paraffin or other semi-water proof preparation or they may be punched from a ribbon of paper likewise impregnated with paraffin or other suitable semi-waterproof material fed by co-ordinating means, said means later shaping the blanks into cells or containers temporarily bonded together by a paraffin coating or the like. The paraffin not only stiffens the walls of the cells but serves as the means for bonding together temporarily the separable units,—forming the flat.

These temporarily united plant cells or containers may if desired be provided with a bottom or floor of cardboard which is also impregnated or coated with paraffin and when heated serves to unite the floor plate with the edges of the several plant cells or containers, thereby increasing the rigidity of the "flat" and insuring the soil and plants against the possibility of accidental discharge through the bottom of the tray.

The seeds may be germinated in the usual wooden tray or "flat" as in the past and the young plants may later be transplanted to separate individual plant-cells, or to plant-cells temporarily bonded together as a tray, until separated as the plants are sold. It is however, the purpose of the invention to employ the divisible plant-cell flat for initially germinating seeds, thus doing away entirely with the usual wooden "flat" for that purpose.

With the foregoing and other objects in view which will appear as the description proceeds the invention further resides in the details of construction hereinafter described and claimed, it being understood that changes may be made in the precise embodiment of the invention herein disclosed without departing from the spirit of the same.

In the drawings accompanying this specification:—

Figure 1 is a paper blank, scored and punched, which may or may not be coated with paraffin or other semi-waterproofing cohesive compound before being shaped into tubular form in the construction of the divisible flat.

Figure 2 is a perspective view, showing the blank shaped into tubular form with its ends overlapping, and secured together by a coating of paraffin, or other means.

Figure 3 is a cross-sectional view, taken on or about line 3—3 of Figure 2, viewed in the direction indicated by the arrows.

Figure 4 is a diagrammatic view of the divisible flat, comprising a group of plant-cells or containers held temporarily in united relation by a coating of paraffin or other compound to which the plant containers are subjected either before or after they are assembled as a flat, the drawings showing—by dotted lines—a number of the units removed, as when sold.

Figure 5 is a fragmentary vertical sectional view through a row of plant-cells or containers, mounted upon a floor, formed of cardboard or the like, also coated with paraffin that it may be bound temporarily to the edges of the walls of the respective containers.

Figure 6 is a perspective view of a modification of the plant container.

Figure 7 is a cross-sectional view, taken on or about line 7—7 of Figure 6,—as viewed in the direction taken by the arrows.

Figure 8 is a fragmentary plan view of a "flat" embodying the individual plant cells or containers shown in Figure 6, bonded together in a divisible unit by a coating of paraffin or like material.

Figure 9 is a perspective view of another modification of a plant-cell or container.

Figure 10 is a cross-sectional view, taken on or about line 10—10 of Figure 9, viewed in the direction indicated by the arrows.

Figure 11 is a fragmentary plan view of another modification of the divisible flat, embodying the individual plant cells or containers shown in Figure 9, bonded to each other and to a floor plate with paraffin.

Referring now to the reference numerals placed upon the drawings:—

The numeral 1, indicates a paper blank, punched with a plurality of openings 2, and scored medially between the openings, as indicated by dotted lines 3, for the purpose of readily bending the blank into tubular form with its edges 4 overlapping,—see Figure 2. After the blank has been bent into tubular form—see Figures 2 and 3—it may be dipped or coated with paraffin to protect it from moisture,—to assist in retaining its tubular shape,—and to provide for the temporary adhesion of a plurality of containers—see Figure 4—assembled in contiguous relation to form a greenhouse planting or seed germinating flat.

The numeral 5 indicates a floor—formed of paper or cardboard,—impregnated with paraffin or other substance of similar nature,—on which a united block of tubular containers 6 rest and when warmed slightly, the paraffin serves to unite the floor and containers temporarily together as an integral group or unit. The floor 5 prevents the roots from protruding through the bottom of the containers,—and as the plants are sold, the respective units may be removed from the floor and each other without difficulty by applying an ordinary table knife between the walls of the containers and between their edges and the floor, without disturbing the soil or the root system of any individual plant, forming the group.

In the modification shown in Figures 6, 7 and 8, the individual plant containers $6^a$ are diamond or lozenge shaped in cross-section, and are formed with a plurality of openings $2^a$ as clearly indicated in the drawings. The overlapping edges $4^a$ are united by any suitable means, preferably a paraffin semi-waterproof coating.

In the modification shown in Figures 9, 10, and 11, the plant cells or containers $6^b$ are of circular formation. The overlapping edges $4^b$—$4^b$ of the container are held together by the paraffin coating previously referred to. A plurality of openings $2^b$ are provided as in the other forms of construction for the passage of the plant roots.

Having described my invention, what I claim is:—

1. A divisible flat for germinating seeds, comprising a plurality of separable tubular units, adapted for housing seed, soil and other plant sustaining elements, bedded in the respective tubular units; and means for temporarily uniting the several tubular units throughout their length in contiguous abutting relation, said means being adapted to permit the ready separation of said divisible flat into as many units as may be desired.

2. A device of the character described, comprising a plurality of plant containers, constructed from blanks of flexible fabric, with a plurality of holes arbitrarily arranged in spaced relation to each other, each blank being bent to form a tube, open at each end, with walls at right angles to each other; and an adhesive coating consisting of a relatively waterproof compound covering the walls of said tubes and temporarily securing said plant containers together as a unit until manually separated.

3. A device of the character described, comprising a plurality of blanks impregnated with paraffin or the like, punched from flexible fabric with a plurality of holes arbitrarily arranged in spaced relation to each other, said blanks folded to form plant-container tubes, open at each end, with walls at right angles to each other and contiguous to the walls of adjacent tubes; and a second coating of paraffin covering the walls of the tubes, whereby they may be stiffened and temporarily united together as a divisible unitary structure.

4. A divisible flat or tray of the character described, comprising a plurality of tubular units, open at each end with walls at right angles to each other, with a plurality of holes through the walls in spaced relation at each corner of the tubes, said tubular units being assembled in contiguous relation; and a coating of paraffin or the like, covering the walls of the tube, whereby the tubular units are temporarily secured together as an integral divisible tray.

5. A divisible flat or tray of the character described, comprising a plurality of blanks punched from flexible fabric impregnated with paraffin, folded to form tubes with walls at right angles to each other,—the corners formed by said walls having openings in spaced relation to each other, said tubes being grouped together to form a block; a paraffined coating covering said plurality of tubes; and a floor-plate impregnated with paraffin for supporting the tubes grouped thereon and united temporarily thereto.

6. In a divisible flat or tray for germinating seeds, the combination of a plurality of hollow units formed of fabric, having lateral openings through their walls; a floor plate adapted to prevent the roots from protruding downwardly until detached therefrom for planting; and a semi-waterproof coating adapted to impregnate, and to unite the walls of the several units and floor plate together, whereby said elements may be connected temporarily as a unitary structure and readily separable as may be required.

RALPH B. OTWELL.